United States Patent [19]

Malmberg

[11] Patent Number: 5,778,592
[45] Date of Patent: Jul. 14, 1998

[54] FISHING ROD TENDER

[76] Inventor: James A. Malmberg. S208 Delta College. University Center. Mich. 48710

[21] Appl. No.: 610,838

[22] Filed: Mar. 5, 1996

[51] Int. Cl.[6] .................................................. A01K 87/00
[52] U.S. Cl. ....................................................... 43/21.2
[58] Field of Search ...................... 43/21.2, 17; 248/512, 248/515, 517

[56] References Cited

U.S. PATENT DOCUMENTS

| | | | |
|---|---|---|---|
| 1,719,695 | 7/1929 | Ferguson | 43/21.2 |
| 2,628,443 | 2/1953 | Weckerling | 43/15 |
| 2,663,962 | 12/1953 | King | 43/17 |
| 2,828,096 | 3/1958 | Beri | 43/21.2 |
| 2,917,858 | 12/1959 | Ikeuchi | 43/17 |
| 3,074,197 | 1/1963 | Schnars | 43/21.2 |
| 3,190,026 | 6/1965 | Roszak | 43/17 |
| 3,431,670 | 3/1969 | Harpham | 43/21.2 |
| 3,772,816 | 11/1973 | Ridge | 43/21.2 |
| 3,862,508 | 1/1975 | Morgan | 43/17 |
| 4,031,651 | 6/1977 | Titze | 43/21.2 |
| 4,161,839 | 7/1979 | Ward | 248/515 |
| 4,177,596 | 12/1979 | Chon | 43/21.2 |
| 4,244,132 | 1/1981 | Hoffman et al. | 43/21.2 |
| 4,642,930 | 2/1987 | Graf | 43/17 |
| 4,829,697 | 5/1989 | Nakata | 43/17 |
| 4,852,290 | 8/1989 | Wallace et al. | 43/17 |
| 4,916,847 | 4/1990 | Rusgo | 43/19.2 |
| 5,115,590 | 5/1992 | Larson | 43/17 |
| 5,295,321 | 3/1994 | Matura | 42/21.2 |
| 5,355,611 | 10/1994 | Dahlberg et al. | 43/21.2 |

*Primary Examiner*—Joseph J. Hail, III
*Attorney, Agent, or Firm*—John J. Swartz

[57] ABSTRACT

A fishing rod tender for mounting a fishing rod on a vertically moveable object, such as a boat, including mechanism for maintaining the rod tip end at a substantially constant distance from a water bed as the rod support member moves vertically.

2 Claims, 4 Drawing Sheets

5,778,592

FISHING ROD TENDER

BACKGROUND OF THE INVENTION

1. Field of the Invention

This invention relates to a fishing rod tender and more particularly to a tender which will maintain the level of a boat mounted, fishing rod tip end, which is vertically restrained by a fishing line coupled to an anchor, substantially constant.

2. Description of the Prior Art and Objects

The Great Lakes, which surround the State of Michigan, are a perch fishing haven. Fishing for fish such as perch, which are typically so-called "bottom feeders", requires that the bait, typically minnows, be disposed adjacent the bottom or the bed of the water in which the perch swim. To this end, it is rather conventional for a fisherman to secure an anchor or sinker to the end of a fishing line and then tie one or more fish hooks, on which minnows are impaled, to the line upstream of the sinker so that the minnows are placed immediately adjacent, or slightly above, the lake bed bottom.

Fishermen may lawfully utilize two poles when fishing for perch, however, it is difficult to simultaneously hold two fishing poles, particularly when a line is being cast or retrieved. Accordingly, fishermen have heretofore utilized fishing rod tenders which will hold one of the rods while the other rod is being attended to. One such fishing tender for mounting in a boat is illustrated in the U.S. Pat. No. 3,431,670 issued to L. M. Harpham on Mar. 11, 1969, however, this prior construction does not maintain the fishing rod tip end at the same level with limited changes in the elevation of the boat and the fishing rod tender but instead will vertically lift the tip end, line and anchor.

Many consider it imperative to successful perch fishing that the bait be still and that the vertical level of the bait be maintained substantially constant. The Great Lakes are much larger than most, if not all, inland lakes and the surface thereof is typically more wavy than inland lakes. Such wave action causes a boat disposed therein to rock and vertically move. If the boat and the fishing rod tender move vertically with wave action, the bait associated with a rod mounted on a prior art rod tender will "bounce" off the bottom and fishing success will be impaired. Accordingly, it is an object of the present invention to provide a new and novel fishing rod tender which will maintain a fishing bait mounted on one end of a fishing line, having an anchor coupled to that end, and an opposite end coupled to a fishing rod mounted on the tender, adjacent a fishing bed bottom.

It is another object of the present invention to provide a fishing rod tender which will allow the fishing rod tip end supporting fishing line having an anchor coupled thereto to remain at substantially the same vertical level as the fishing rod tender moves vertically.

Another object of the present invention is to provide a fishing rod tender including a vertical mount and a fishing rod holder bar swingably mounted on the vertical mount such that the fishing rod tip end supporting a fishing line having an anchor coupled thereto, is allowed to remain at a substantially constant vertical level as the fishing rod tender moves vertically.

It is also known that perch are not "heavy hitters" relative to other game fish. When a perch nibbles on a minnow impaled on a fish hook, which is secured to a taut fishing line, the rod end will slightly fluctuate in the rod tender. Sometimes, great finesse must be utilized in maintaining the bait stationary and also in setting the hook. Typically, fishermen will, upon seeing the rod tip end slightly vibrate, grasp the fishing rod and slightly upwardly jerk the rod and tip end to set the hook in the mouth of the fish.

A further object of the present invention is to provide a fishing rod tender of the type described including retaining mechanism for yieldably holding a fishing rod but allowing the fishing rod to be easily yieldably, vertically moved relative to the retaining mechanism.

Still another object of the present invention is to provide a fishing rod tender of the type described including a fishing rod holder bar mounting a cradle and a yieldable retainer yieldably retaining a fishing rod in the cradle but allowing the rod to be vertically moved relative to the cradle to escape the cradle.

It is another object of the present invention to provide a fishing rod tender of the type described for mounting in a boat and maintaining taut a fishing line, having a sinker and fish bait thereon.

Fishing rod tenders have been provided heretofore which include a cradle for the reel mounting end of the fishing rod, such as that disclosed in the aforementioned Harpham Patent and as well as the U.S. Pat. No. 4,916,847 issued to David E. Rusgo on Apr. 17, 1990 and U.S. Pat. No. 5,295,321 issued to Albert J. Matura on Mar. 22, 1994. Such cradles, however, typically include an overlying bracket to preclude the fishing rod handle from escaping the cradle in which the fishing rod handle is held. Such handle confining bails may be necessary for large game fish, however, the relatively small perch normally do not strike with sufficient power to dislodge the handle end of the rod from the cradle in which it is received. Nonetheless, a retention device is necessary to preclude the inadvertent dislodgement of the handle end in the event of a snag if the boat inadvertently drifts. Although a perch fishing boat is typically anchored, if only one anchor line is tied to the bow of the boat, the rear of the boat will sometimes swing about the front anchor line. Accordingly, it is a further object of the present invention to provide a new and novel rod tender which includes a yieldable member for yieldably detachably holding the rod handle on a cradle but allowing the rod handle to be vertically moved relative to the cradle to escape the cradle.

It is a further object of the present invention to provide a fishing rod tender for mounting a perch fishing rig utilized to stationarily hold bait along the water bed.

Other objects and advantages of the present invention will become apparent to those of ordinary skill in the art as the description thereof proceeds.

SUMMARY OF THE INVENTION

A fishing rod tender for mounting a fishing rod on a vertically moveable platform, such as a boat, the fishing rod having a handle end for mounting a fishing reel and an opposite tip end through which a fishing line freely passes, the tender including: mounting mechanism for mounting the handle end of the fishing rod for vertical movement relative to the opposite tip end as the tender vertically moves to maintain the opposite rod tip end substantially vertically stationary.

DESCRIPTION OF THE DRAWINGS

The invention may be more readily understood by referring to the accompanying drawings, in which.

DESCRIPTION OF PREFERRED EMBODIMENT

Figures 7, 8:
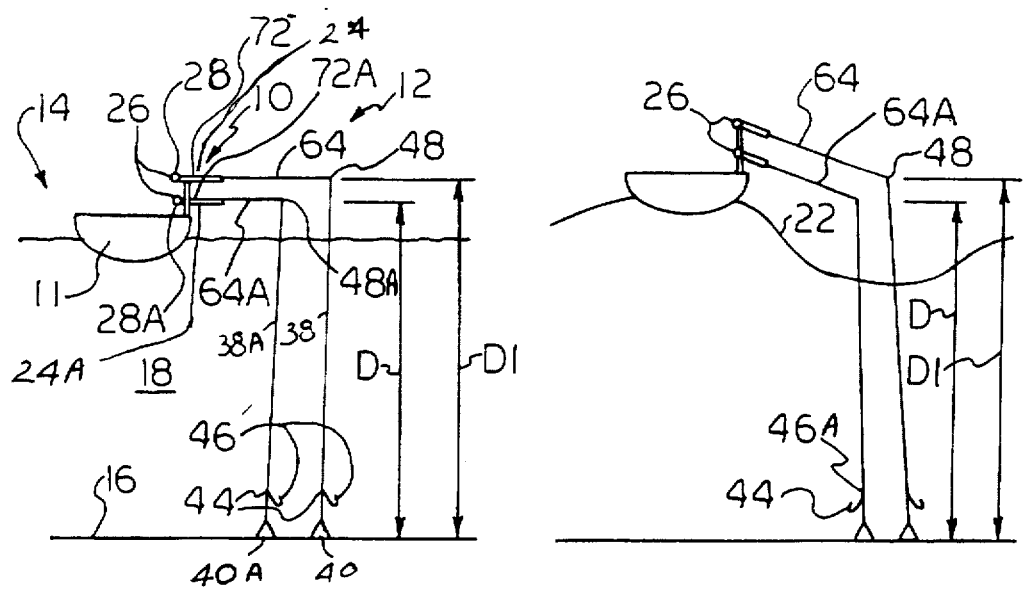
FIG. 7 is a schematic view illustrating the apparatus constructed according to the present invention mounted on a boat, floating in calm water.
FIG. 8 is a view similar to FIG. 7 but illustrating the boat, floating in wavy surface water, and a rod tender mounted thereon, in an elevated position but maintaining the rod tip ends substantially vertically stationary.

Apparatus constructed according to the present invention, generally designated 10, is particularly adapted for use with a boat 11, and bottom fishing apparatus, generally designated 12 (FIGS. 7–9), for bottom fishing in a lake or other body of water, generally designated 14, having a lake bed 16 filled with water 18 (FIGS. 7 and 8). The boat 11, which provides the platform for the fishing rod tender 10, is vertically shiftable a limited distance with surface waves, generally designated 22, from a vertically lower position illustrated in FIG. 7 to a vertically raised position illustrated in FIG. 8.

Figure 9:
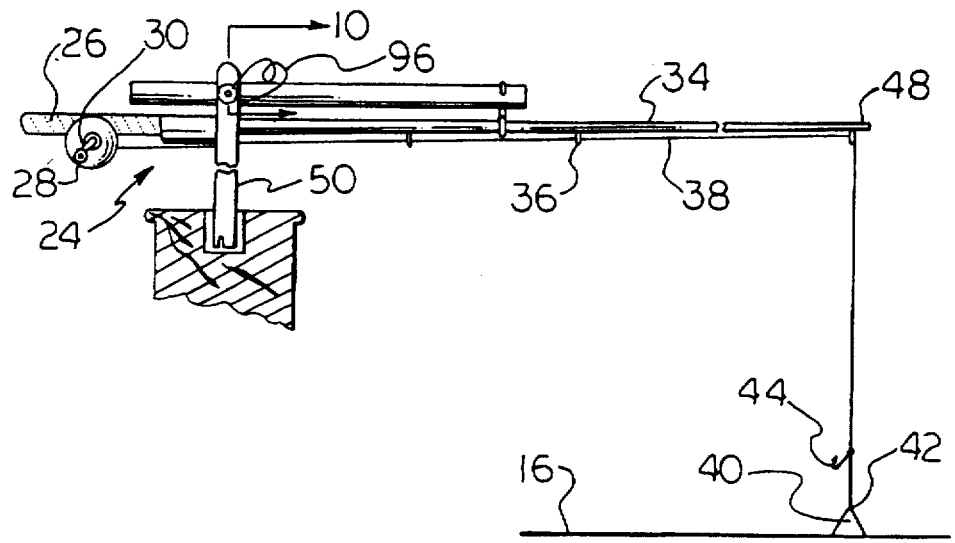
FIG. 9 is a side elevational view illustrating only the uppermost rod mounting bar mounting a fishing rod and reel, parts of the rod holder being broken away to better illustrate the reel, and illustrating a stop member in an adjusted stopping position.
Figure 10:
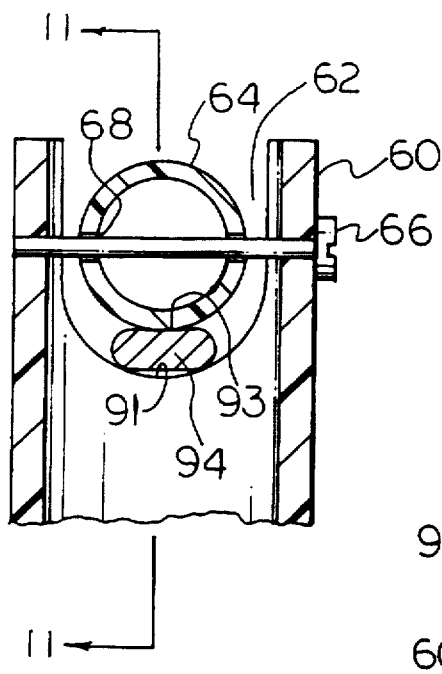
FIG. 10 is a sectional end view, taken along the line 10—10 of FIG. 9, illustrating an upper stop member in an adjusted stopping position.
Figure 11:
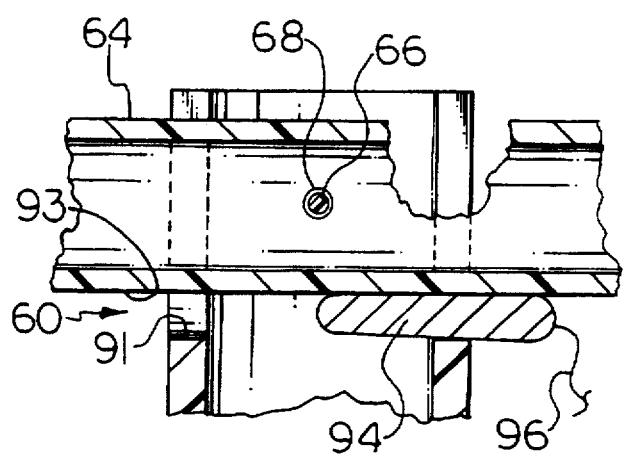
FIG. 11 is a section front view taken along the line 11—11 of FIG. 10.

The fishing rod apparatus 12 includes a fishing rod, generally designated 24, including a handle end 26 mounting a fishing reel 28 provided with a crank 30 (FIG. 9). A fishing line 38 is wound on the reel 28, as usual, and includes a terminal end 42. The fishing rod 24 includes an elongate flexible staff 34, having a plurality of eyelets 36, for receiving the fishing line 38 wound around the reel 28 as usual.

The bottom feeding apparatus 12 includes a sinker 40 coupled to the fishing line terminal end 42 for holding the terminal end 42 stationary on the fishing bed bottom 16 and maintain the fishing line 38 taut and restrict vertical upward movement of the tip end. Sinker 40 and line 38 will restrict upward movement of the fishing rod tip end 42, when the line 38 is taut and the line 38 is not allowed to be payed out from the fishing reel 28, until the weight of the anchor or sinker 40 is overcome. The fishing reel 28 typically includes a clutch that can be detachably engaged to selectively allow additional line to be payed out. A "perch rig" or hook 44 is coupled to the line via a leader 46 for mounting or impaling a minnow or other bait immediately adjacent to the water bed 16.

It is important that the vertical level of the rod tip end 48 be maintained substantially constant with limited vertical movement of the boat 11, so that the sinker 40 and minnow mounting hook 44 do not move vertically relative to the bottom 16 and the distances D between the rod tip end 48 and the water bed 16 remains constant. As illustrated in FIGS. 7 and 8, the wave action will cause the boat 11 to rock and shift vertically a limited distance from a vertically lower position, illustrated in FIG. 7, to the vertically raised position, illustrated in FIG. 8 relative to the bottom 16.

The fishing rod tender 10 will allow the boat 11 to "swing beneath" the fishing rod tip 48 held by line 38 and sinker 40 against upward movement, and allow the fishing rod handle end 26 to move vertically relative to the tip end 48 which is maintained vertically stationary by the line 38 and sinker 40.

The fishing rod tender 10 includes a vertical or upstanding standard, generally designated 50, comprising a hollow thin walled cylinder or tube having, at its lower end, a plurality of downwardly opening notches 52, cut in the lower terminal end thereof defining a plurality of teeth 54, which mesh with a plurality of upwardly opening, complimentally formed notches and teeth 56 and 58, respectively provided in an upwardly opening boat well 51 provided in the boat gunwale 53. The boat well 51 provides a support platform for the tender 10. The cooperating notches and teeth detachably prevent rotation of the standard 50 about its vertical axis.

The standard 50 includes a bifurcated upper end 60 defining an upwardly opening, open-ended passage 62 therethrough for receiving an upper rod holder bar, generally designated 64. A pivot pin 66, which is received in any selected one of a plurality of pivot holes 68 spaced along the length of elongate bar 64, pivotally mounts the rod holder bar on the upper standard end 60.

Figure 1:
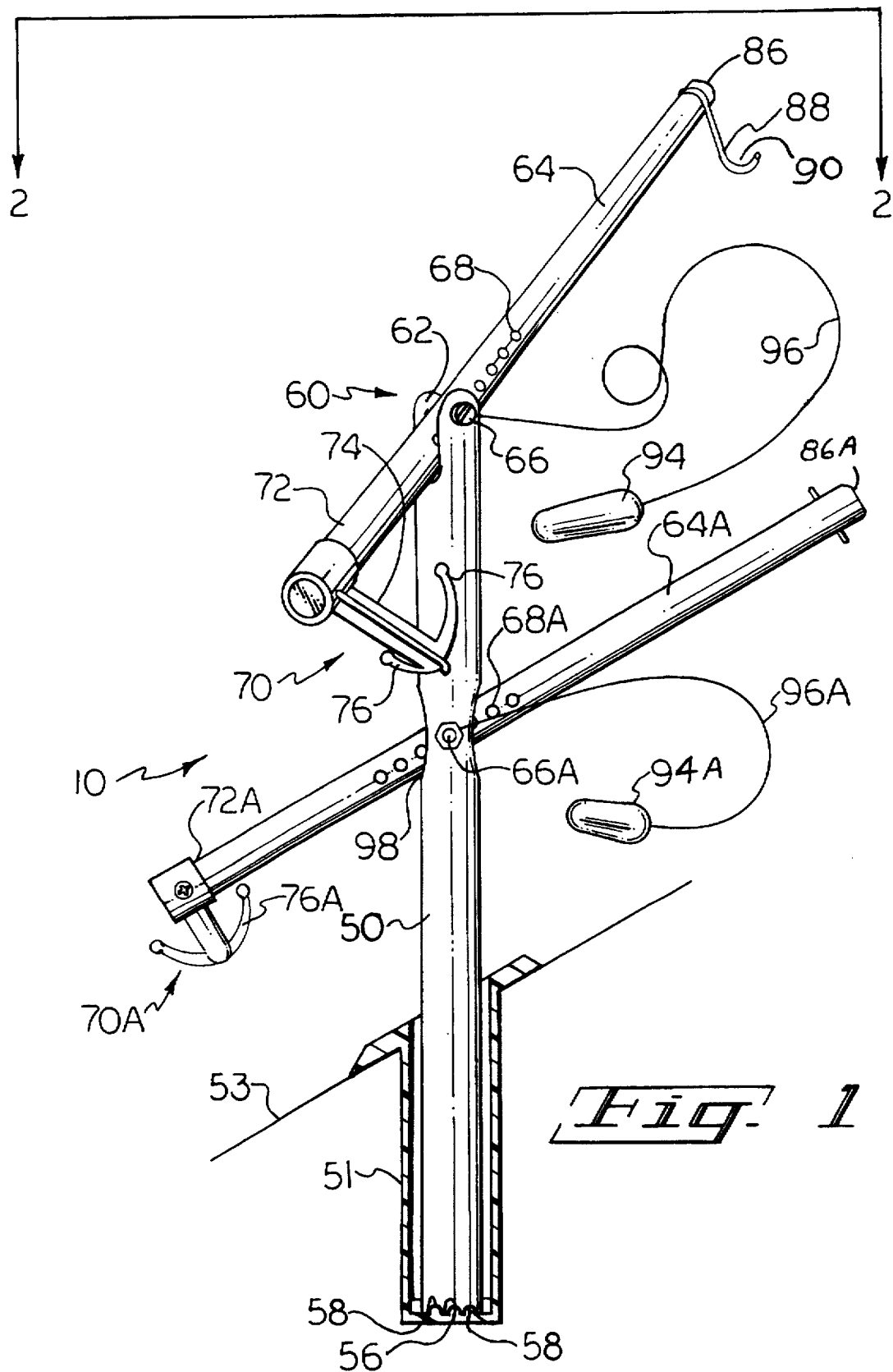
FIG. 1 is a front elevational view illustrating a fishing rod tender, constructed according to the present invention, mounted on the hull of a boat, partly illustrated in section.
Figure 2:
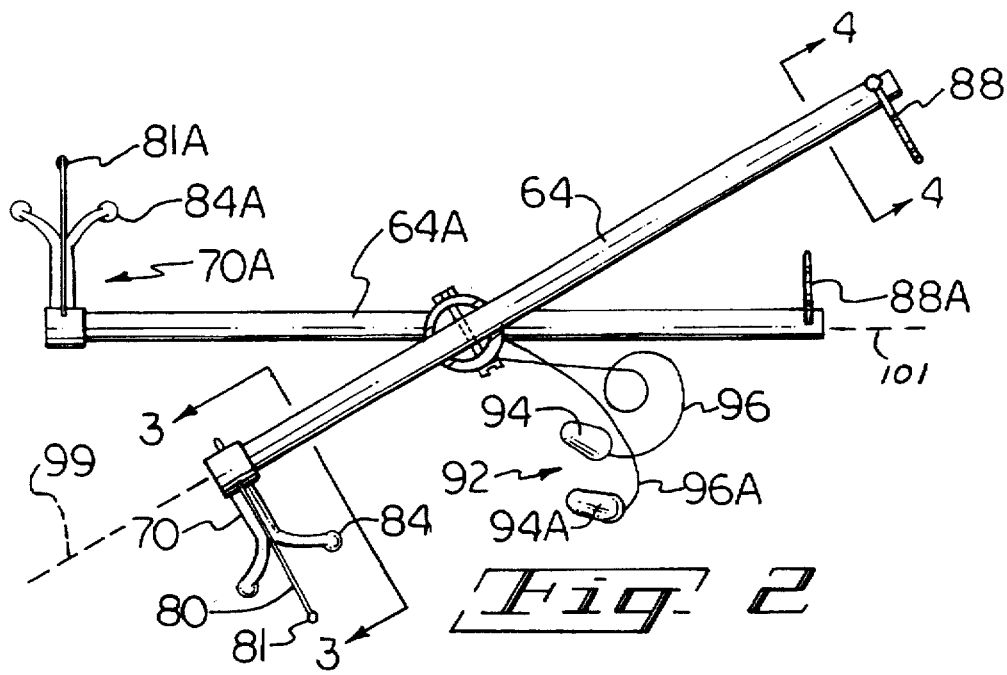
FIG. 2 is a top plan view thereof taken along the line 2—2 of FIG. 1.
Figure 3:
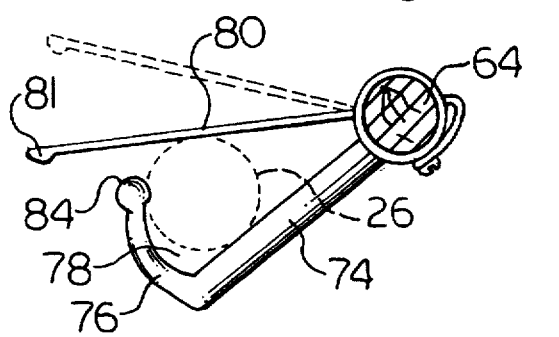
FIG. 3 is a sectional end view taken along the line 3—3 of FIG. 2, a fishing rod handle being illustrated in phantom.
Figure 4:
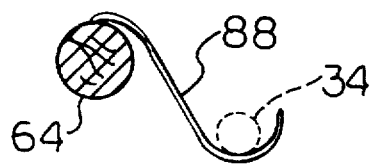
FIG. 4 is a sectional view taken along the line 4—4 of FIG. 2 with a fishing rod staff being illustrated in phantom.
Figure 5:
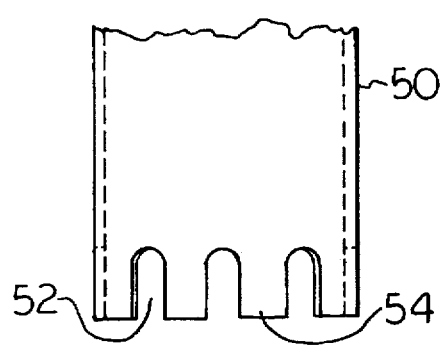
FIG. 5 is a greatly enlarged view, front elevational, illustrating only the lower end of the vertical standard illustrated in FIG. 1.
Figure 6:
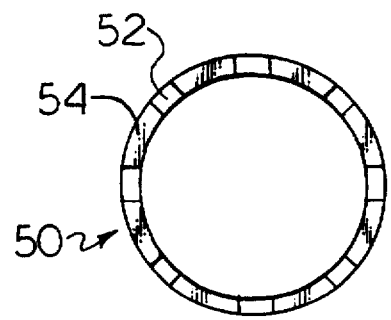
FIG. 6 is a bottom plan view of the standard illustrated in FIG. 5.

The upper rod holder bar 64 includes an upwardly opening cradle, generally designated 70, extending laterally outwardly away from the handle mounting end 72 of the rod holding bar 64. The cradle 70 includes a stem 74 having a pair of bifurcated upstanding terminal branches or fingers 76 which cooperate to define an upwardly opening channel 78 for receiving the fishing rod handle 26. A yieldable, spring steel handle retainer, generally designated 80, is fixed to the cradle 70 and includes a distal end 81 spaced a slight distance above the terminal ends 84 of fingers 76. The member 80 is yieldable upwardly, to the position illustrated in chain lines in FIG. 3, to allow the user to move the handle 26 vertically and laterally outwardly relative to the cradle 70, when a fish which has been caught on a fish hook 44, so that the user will have better access to the reel 28, and the fish can be "reeled in".

Mounted at the opposite end 86 of the upper rod holding bar 64 is a forward, S-shaped cradle member 88 which receives the shaft or staff 34 of the fishing rod 24 and includes an upwardly opening well 90 that will allow the rod staff 34 to be quickly vertically removed.

Apparatus, generally designated 92, is provided for selectively vertically locking the rod holding bar 64 to preclude its vertical swinging movement relative to the standard 50 and includes a stop, member 94 fixed to a line 96 that is coupled to the pivot 66. The stop member 94 is inserted between the base 91 of upwardly opening channel 62 and the underside 93 of the rod holding bar 64.

A second passage 98 is cut through the standard 50 below the upper passage 62 and receives a second, lower rod holding bar, generally designated 64A, which is substantially identical to the rod 64 and substantially identical parts will be referred to by substantially identical reference characters followed by letter A subscript. The passage 98 is angularly offset relative the passage 62 so that the rod holding bars lie in intersecting vertical planes 99 and 101.

The cradles 70 and 88 are identical to the cradles 70A and 88A except that they extend from the rod holding bars 64 and 64A, respectively, in laterally opposite direction so that the fishing reels 28 and 28A are always laterally outermost relative to the bars 64 and 64A, respectively, to minimize any entanglement which might inadvertently occur between the fishing lines 38 and 38A.

The upper handle mounting end 72 is on one lateral side of the lower handle end 72A whereas the upper opposite end 86 is disposed on the laterally opposite side of the lower opposite end 86A. This construction disposes the cradles 70, 70A most distant relative to each other so that the fishing reels 12 mounted thereon can freely be independently operated without interference with the other reel.

THE OPERATION

The fishermen will bait the hooks 46 and 46A and individually cast the sinkers 40, 40A and lines 38 and 38A into the water as illustrated in FIG. 7. The rod 24 is disposed on the upper rod holding bar 64 and the lower fishing rod 24A is disposed on the lower fishing rod bar 64A. In order to mount the rod mounting ends 26 and 26A in the cradles 78 and 78A (the position illustrated in FIG. 3), the yieldable members 80 and 80A are sprung upwardly to the positions illustrated in chain lines in FIG. 3 to allow the handles 26 and 26A to be positioned as illustrated in the positions illustrated in chain lines in FIG. 3.

As the waves 22 move and shift the boat 11 a limited distance vertically, from the lowered position, illustrated in FIG. 7, to the vertically raised position, illustrated in FIG. 8, the rod holding bars 64 and 64A will pivot about the axes 66 and 66A, respectively, so that the levels of rod tip ends 48 and 48A held by lines 38 and 38A and sinkers 40 and 40A, respectively are maintained substantially constant and not forced upwardly so that the vertical distances D and D1 between the rod tip ends 48 and 48A and the sinkers 40 and 40A are also substantially constant. In this way, the bait mounted on hooks 46 and 46A will not be moved vertically off the bottom end and optimum fishing conditions will result.

If it is desired to lock the position of one of the rods, such as rod 24 for example, relative to the standard 50, the stop block 94 is inserted between the underside 93 of the rod 24 and the bottom 91 of upper channel 62. Rod 24A may be similarly locked in position with stop block 94A.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A fishing rod tender including:

an upstanding standard for mounting on a vertically moveable foundation;

a fishing rod mounting bar having
    one inner end for mounting a fishing rod handle end and a fishing reel mounted on said handle end and
    an opposite outer end for receiving an elongate fishing rod staff coupled to said handle end, said staff including an outer tip end through which fishing line, on said reel, freely passes;

said opposite end cantileverly mounting said tip end outwardly of said foundation; and mount means, between said ends of said fishing rod mounting bar, for pivotally mounting said fishing rod mounting bar on said standard;

said upstanding standard including a portion defining a generally horizontal passage receiving said fishing rod mounting bar, and means for selectively preventing pivotal movement of said fishing rod mounting bar relative to said upstanding standard comprising stop means detachably insertable in a wedging position between said fishing rod mounting bar and said portion of said standard defining said passage.

2. A fishing rod tender including:

an upstanding standard for mounting on a vertically moveable foundation, including a plurality of vertically spaced, horizontal passages therethrough, and;

a first fishing rod mounting bar being received by one of said passages, and having
    one end for mounting a fishing rod handle end and a fishing reel mounted on said handle end, and
    an opposite end for receiving an elongate fishing rod staff coupled to said handle end, said staff including a tip end through which fishing line, on said reel, freely passes; and mount means, between said ends of said first fishing rod mounting bar, for pivotally mounting said first fishing rod mounting bar on said standard;

said first fishing rod mounting bar including a first upwardly opening, open ended cradle for detachably receiving said handle end; and yieldable means for yieldable retaining said handle end on said first cradle but yieldable to allow said handle end to vertically move relative to said first cradle to vertically escape said first cradle;

said first cradle being disposed on one lateral side of said first fishing rod mounting bar; and a second fishing rod mounting bar received in another of said passages and a second cradle mounted on said second fishing rod mounting bar.

* * * * *